United States Patent
Mishor et al.

(10) Patent No.: US 11,411,674 B2
(45) Date of Patent: Aug. 9, 2022

(54) TRANSMISSION DEVICE AND METHOD FOR TRANSMITTING PUNCTURED DATA MESSAGES HAVING COMMON INPUT BITS AND RECEPTION DEVICE AND METHOD FOR REASSEMBLING AN ENCODED DATA MESSAGE BASED ON PUNCTURED DATA MESSAGES

(71) Applicant: ELBIT SYSTEMS C4I AND CYBER LTD., Netanya (IL)

(72) Inventors: Idan Mishor, Netanya (IL); Oren Idan, Netanya (IL); Oren Nissim Rehovi, Netanya (IL)

(73) Assignee: Elbit Systems C4I and Cyber Ltd., Netanya (IL)

( * ) Notice: Subject to any disclaimer, the term of this patent is extended or adjusted under 35 U.S.C. 154(b) by 0 days.

(21) Appl. No.: 17/687,705

(22) Filed: Mar. 7, 2022

(65) Prior Publication Data

US 2022/0190952 A1    Jun. 16, 2022

Related U.S. Application Data

(63) Continuation of application No. PCT/IL2021/051124, filed on Sep. 14, 2021.

(30) Foreign Application Priority Data

Sep. 30, 2020 (IL) .......................... 277711

(51) Int. Cl.
*H04L 1/00* (2006.01)
*H04W 40/02* (2009.01)
*H04B 17/336* (2015.01)

(52) U.S. Cl.
CPC ......... *H04L 1/0013* (2013.01); *H04B 17/336* (2015.01); *H04W 40/023* (2013.01)

(58) Field of Classification Search
CPC ... H04L 1/0009; H04L 1/0011; H04L 1/0013; H04W 40/023; H04B 17/30; H04B 17/309; H04B 17/336; H04B 17/345
See application file for complete search history.

(56) References Cited

U.S. PATENT DOCUMENTS

| | | | |
|---|---|---|---|
| 5,438,590 A | 8/1995 | Tzukerman et al. | |
| 6,768,778 B1 | 7/2004 | Chen et al. | |

(Continued)

FOREIGN PATENT DOCUMENTS

| | | | | |
|---|---|---|---|---|
| CA | 2348941 C | * | 3/2008 | ........ H03M 13/2721 |
| CA | 2394587 C | * | 9/2008 | ........... H04B 7/2631 |

(Continued)

OTHER PUBLICATIONS

Paper—Oct. 2007 DOI 10.1109/AFRCON.2007.4401628 . (Retrieved on Nov. 25, 2021).retrieved from the Internet at: <https://www.researchgate.net/profile/Fambirai-Takawira/publication/224297109_Repeatpuncture_superorthogonal_convolutional_turbo_codes_in_AWGN_channel/links/02bfe50eed0183acf7000000/Repeat-puncture-superorthogonal-convolutional-turbocodes-in-AWGN-channel.pdf?origin=publication_detail>.

*Primary Examiner* — Kevin D Mew

(57) ABSTRACT

A transmission device and method for repeatedly transmitting punctured data messages is disclosed. The transmission device is configured to puncture an encoded data message over a plurality of consecutive time slots to provide punctured data messages. The punctured data messages include a first punctured data message and a second punctured data message that are alternately transmitted during the consecutive time slots, the first punctured data message arising from puncturing the encoded data message with a first puncture indices series and the second punctured data message arising from the puncturing of the encoded data message with a second puncture indices series that is complementary to the (Continued)

first puncture indices series. A reception device and method for reassembling the encoded data message based on the punctured data messages is also disclosed.

21 Claims, 10 Drawing Sheets

(56) References Cited

U.S. PATENT DOCUMENTS

| | | | |
|---|---|---|---|
| 2005/0157803 A1* | 7/2005 | Kim | H04L 1/0009 375/260 |
| 2006/0209970 A1* | 9/2006 | Kanterakis | H04L 1/0009 714/790 |
| 2009/0110103 A1 | 4/2009 | Maltsev et al. | |
| 2010/0169749 A1 | 7/2010 | Marko | |
| 2012/0008542 A1 | 1/2012 | Koleszar et al. | |
| 2014/0079150 A1* | 3/2014 | Tong | H04L 1/0068 375/295 |

FOREIGN PATENT DOCUMENTS

| | | | | |
|---|---|---|---|---|
| CA | 2701634 A1 | * | 4/2009 | H04L 1/0028 |
| CA | 2540833 C | * | 11/2013 | H04B 7/264 |
| CA | 2609794 C | * | 12/2013 | H03M 13/271 |
| CA | 3060788 A1 | * | 10/2019 | H03M 13/11 |
| EP | 0930738 A2 | | 1/1999 | |
| EP | 3133785 B1 | * | 2/2022 | H03M 13/255 |

* cited by examiner

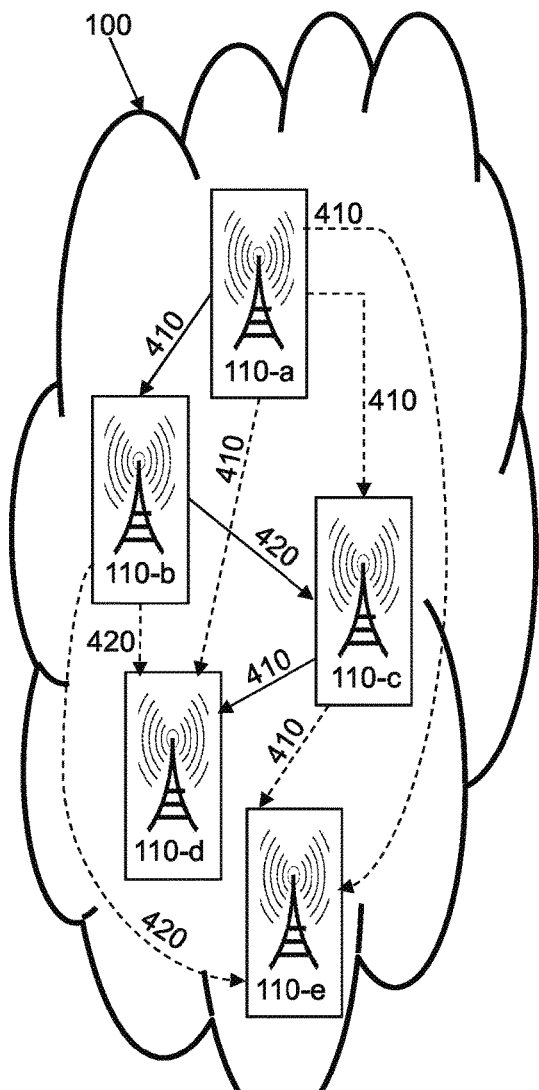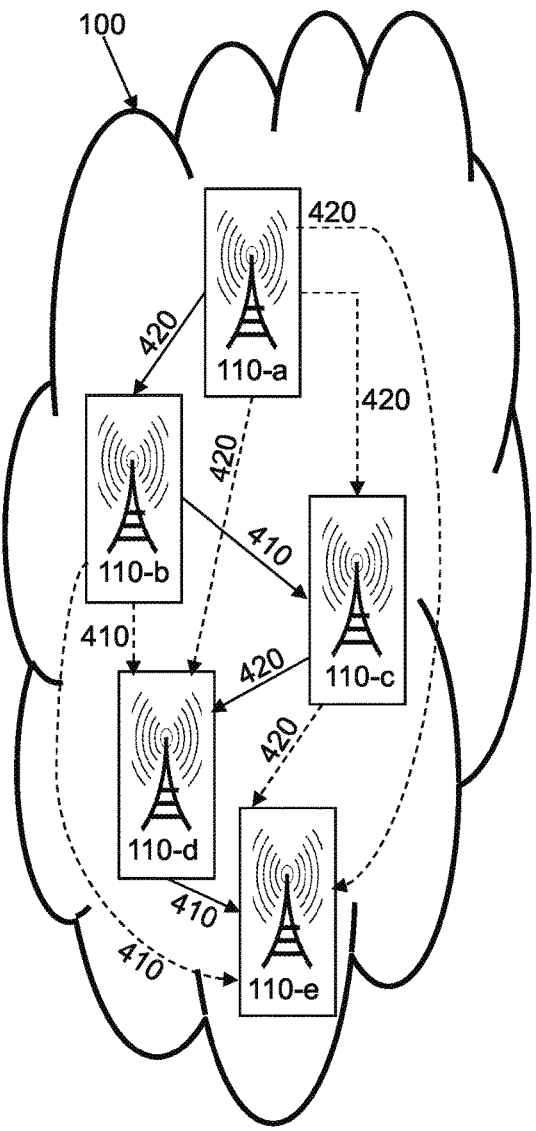
Fig. 4C
Fig. 4D

TRANSMISSION DEVICE AND METHOD FOR TRANSMITTING PUNCTURED DATA MESSAGES HAVING COMMON INPUT BITS AND RECEPTION DEVICE AND METHOD FOR REASSEMBLING AN ENCODED DATA MESSAGE BASED ON PUNCTURED DATA MESSAGES

TECHNICAL FIELD

The invention relates to a transmission device and method for transmitting punctured data messages having common input bits and a reception device and method for reassembling an encoded data message based on punctured data messages.

BACKGROUND

The performance of a receiver in a wireless device within a wireless communications network can be degraded due to noise that is present in the wireless communications network. As a result, the receiver can fail to decode some encoded data messages, i.e. encoded data packets, it receives. A standard solution for addressing this problem is for a wireless device that receives a data message during a first time slot to acknowledge to the transmitting device, during a second time slot, whether or not the data message was successfully decoded. Upon the receiver failing to decode the data message, the transmitting device will repeat transmission of the data message, during a third time slot, at a lower code rate.

It is an object of the present disclosure to transmit data messages to a receiving device within the wireless communications network without requiring the receiving device to acknowledge whether or not the data messages were successfully decoded. In this manner, a number of transmissions within the wireless communications network can be reduced.

Data messages can be routed within a wireless communications network by flooding. To illustrate a known sequence of operations for routing a data message by flooding, attention is drawn to FIGS. 1A to 1D.

As illustrated in FIG. 1A, the routing of a data message 120 by flooding begins with the transmission of the data message 120 by a source wireless device 110-*a* within the wireless communications network 100 to destination wireless devices (e.g., 110-*b*, 110-*c*, 110-*d*, 110-*e*) within the wireless communications network 100 that are linked to the source wireless device 110-*a*. This occurs during a first time slot (i.e., a first hop) of two or more consecutive time slots (i.e., consecutive hops) covered by a flooding window. At least one first destination wireless device (e.g., 110-*b*) of the destination wireless devices (e.g., 110-*b*, 110-*c*, 110-*d*, 110-*e*) receives the data message 120 that is transmitted by the source wireless device 110-*a*, as illustrated in FIG. 1A by the solid arrow between the source wireless device 110-*a* and the first destination wireless device 110-*b*.

As illustrated in FIG. 1B, first destination wireless device 110-*b* transmits the data message 120 that it received from the source wireless device 110-*a* during the first time slot to other destination wireless devices (e.g., 110-*c*, 110-*d*, 110-*e*) in the wireless communications network 100 that are linked to the first destination wireless device 110-*b*. This occurs during a second time slot (i.e., a second hop) of the consecutive times slots (i.e., consecutive hops) covered by the flooding window. In the example illustration of FIG. 1B, second destination wireless device 110-*c* receives the data message 120 that is transmitted by the first destination wireless device 110-*b*.

As with the transmission of the data message 120 by the first destination wireless device 110-*b*, as illustrated in FIG. 1B, each destination wireless device in the wireless communications network 100 that receives the data message 120 during a respective time slot (i.e., a respective hop) transmits the data message to other destination wireless devices in the wireless communications network 100 that are linked to the respective destination wireless device, provided that the flooding window that defines a number of consecutive time slots (i.e., consecutive hops) within the flooding routine is still open.

FIGS. 1C and 1D illustrate the routing of a data message 120 in a flooding routine having a flooding window that covers four consecutive time slots. As illustrated in FIG. 1C, second destination wireless device 110-*c*, which receives data message 120 from first destination wireless device 110-*b* during a second time slot of the consecutive time slots, as illustrated in FIG. 1B, transmits the data message 120 to other destination wireless devices (e.g., 110-*d* and 110-*e*) in the wireless communications network 100 that are linked to the second destination wireless device 110-*c*. This occurs during a third time slot (i.e., a third hop) of the consecutive time slots (i.e., consecutive hops) covered by the flooding window. In the example illustration of FIG. 1C, third destination wireless device 110-*d* receives the data message 120 that is transmitted by the second destination device 110-*c*.

As illustrated in FIG. 1D, third destination wireless device 110-*d*, which receives data message 120 from second destination wireless device 110-*c* during a third time slot of the consecutive time slots, as illustrated in FIG. 1C, transmits the data message 120 to fourth destination device 110-*e* in the wireless communications network 100. This occurs during a fourth time slot (i.e., a fourth hop) of the consecutive time slots (i.e., consecutive hops) covered by the flooding window.

It is an object of the present disclosure to provide a flooding routine for routing data messages 120 within a wireless communications network 100 that improves decoding of the data messages 120 in the presence of noise within the wireless communications network 100.

References considered to be relevant as background to the presently disclosed subject matter are listed below. Acknowledgement of the references herein is not to be inferred as meaning that these are in any way relevant to the patentability of the presently disclosed subject matter.

U.S. Pat. No. 7,650,560, published on Jan. 19, 2010, discloses a method of communication between or among a plurality of devices in a communication system using one or more frames to transmit a plurality of bits includes encoding the plurality of bits in accordance with a first puncture code in a first device of the plurality of devices, transmitting the plurality of encoded bits to a second device of the plurality of devices, and determining in the first device an error condition indicated in a received acknowledgement from the second device. When the error condition indicates a first error code, retransmitting the encoded bits in accordance with the first puncture code, and when the error condition indicates another error condition, different from the first error code, encoding the plurality of bits in accordance with a second puncture code, different from the first puncture code and transmitting the plurality of encoded bits to the second device.

Zhang et al., "Hybrid ARQ Scheme Using Complementary Punctured Turbo (CPT) Codes", Advances in Computer Science Research, Vol. 58, pp. 135-139, 2016, discloses a hybrid automatic repeat request (HARQ) scheme that uses complementary punctured turbo (CPT) codes. The information bit sequence is encoded by a rate-1/3 convolutional turbo code, and then punctured by different sets of coded bits using complementary perforation patterns, which is used for turbo decoding. The sets of coded bits are sent alternatively, and are combined with previous stored code sequence at the receiver.

U.S. Pat. No. 7,995,578, published on Aug. 9, 2011, provides a repetition apparatus and method for repeatedly transmitting and receiving a data packet using different puncturing patterns to overcome signal attenuation and fading in a high speed mobile environment by repeatedly transmitting the duplicated information bit sequences with parity bits having a different puncturing pattern after channel-encoding the duplicated information bit. The repetition apparatus for repeatedly transmitting a data packet, includes a dual data generator for generating duplicated information bit sequences identical to each of information bit sequences to transmit, a channel encoder for dividing each of the duplicated information bit sequences into a plurality of information bits, and generating coded data packets alternately having a plurality of parity bits according to different puncturing patterns for each of the divided information bits, and a transmitter for transmitting the generated coded data packets sequentially.

U.S. Pat. No. 8,595,590, published on Nov. 26, 2013, discloses systems and methods for encoding and decoding check-irregular non-systematic IRA codes of messages in any communication or electronic system where capacity achieving coding is desired. According to these systems and methods, IRA coding strategies, including ones that employ capacity-approaching non-systematic IRA codes that are irregular and that exhibit a low error floor, are employed. These non-systematic IRA codes are particularly advantageous in scenarios in which up to half of coded bits could be lost due to channel impairments and/or where complementary coded bits are desired to transmit over two or more communications sub-channels. An encoder includes information bit repeaters and encoders, one or more interleavers, check node combiners, a check node by-pass and an accumulator. A decoder includes a demapper, one or more check node processors, an accumulator decoder, a bit decoder, and one or more interleavers/deinterleavers.

U.S. Patent Application Publication No. 2002/0093937, published on Jul. 18, 2002, provides a data transmitting/receiving method in a HARQ data communication system. To transmit a physical layer information stream having a plurality of sub-blocks, each sub-block having an error correction code, a QoS (Quality of Service), and a priority if the sub-blocks has a different QoS, the encoded physical layer information stream is divided into a plurality of slots. The slot data are sequentially transmitted to a receiver in predetermined time intervals. If an HARQ (Hybrid Automatic Repeat Request) message for the initial slot data is received from the receiver, indicating that at least one of the sub-block in the initial slot data has a reception error and the other sub-blocks are good in reception, slot data with a sub-block having an error repeated within the number of the sub-blocks is retransmitted after transmission of initial slot data.

GENERAL DESCRIPTION

In accordance with a first aspect of the presently disclosed subject matter, there is provided a transmission device for repeatedly transmitting punctured data messages, the device comprising: a puncturing unit configured, for each time slot of two or more consecutive time slots, to puncture an encoded data message with a respective puncture indices series, being a first puncture indices series or a second puncture indices series that is complementary to the first puncture indices series, thereby giving rise to a respective punctured data message having a first code rate that is higher than a second code rate of the encoded data message, the respective punctured data message alternating during the consecutive time slots between a first punctured data message that arises from puncturing the encoded data message with the first puncture indices series and a second punctured data message that arises from the puncturing of the encoded data message with the second puncture indices series; and a transmitter configured to alternately transmit the first punctured data message and the second punctured data message during the consecutive time slots.

In some cases, the transmission device further comprises: a multiplexer configured to select the first puncture indices series or the second puncture indices series for puncturing the encoded data message for each time slot of the consecutive time slots.

In some cases, the first code rate is about 2/3, and the second code rate is about 1/3.

In some cases, the first punctured data message and the second punctured data message are transmitted within a flooding waveform during a flooding window.

In some cases, the flooding window covers at least three consecutive time slots.

In some cases, the transmission device further comprises: a modulator configured, for each time slot of the consecutive time slots, to modulate a part of the flooding waveform associated with the respective time slot with a distinct training data series that is indicative of the respective time slot.

In accordance with a second aspect of the presently disclosed subject matter, there is provided a reception device for reassembling an encoded data message, the device comprising: a receiver configured to receive punctured data messages during two or more consecutive time slots, the punctured data messages including a first punctured data message and a second punctured data message alternately received during the consecutive time slots; and a re-assembler configured to reassemble the encoded data message based on the punctured data messages; wherein the first punctured data message is an encoded data message punctured with a first puncture indices series, wherein the second punctured data message is the encoded data message punctured with a second puncture indices series that is complementary to the first puncture indices series, and wherein each of the punctured data messages has a first code rate that is a higher than a second code rate of the encoded data message.

In some cases, the first code rate is about 2/3, and the second code rate is about 1/3.

In some cases, the punctured data messages are received within a flooding waveform during a flooding window.

In some cases, the flooding window covers at least three consecutive time slots.

In some cases, the reception device further comprises: a signal-to-noise ratio (SNR) adjustment unit configured, based on a respective SNR measurement of each punctured data message of the punctured data messages, to normalize the punctured data messages, thereby giving rise to normalized data messages.

In some cases, the encoded data message is reassembled based on the normalized data messages.

In some cases, the first punctured data message is received during a first time slot and a third time slot of the consecutive time slots, and the second punctured data message is received during a second time slot of the consecutive time slots, the second time slot being immediately preceded by the first time slot and immediately followed by the third time slot, and the device further comprises: at least one summarization unit configured to perform a first equal data summarization of the normalized data messages associated with the first punctured data message received during the first time slot and the third time slot, thereby giving rise to a first summarized data message; wherein the SNR adjustment unit is further configured to normalize the first summarized data message and a normalized data message of the normalized data messages that is associated with the second punctured data message, thereby giving rise to a normalized first summarized data message and a twice normalized second punctured data message; and wherein the re-assembler is configured to reassemble the encoded data message based on the normalized first summarized data message and the twice normalized second punctured data message.

In some cases, the second punctured data message is also received during a fourth time slot of the consecutive time slots, the fourth time slot immediately following the third time slot; wherein the at least one summarization unit is configured to perform: (a) a second equal data summarization of the normalized data messages associated with the first punctured data message received during the first time slot and the third time slot, thereby giving rise to an updated first summarized data message and (b) a third equal data summarization of the normalized data messages associated with the second punctured data message received during the second time slot and the fourth time slot, thereby giving rise to a second summarized data message; wherein the SNR adjustment unit is further configured to normalize the updated first summarized data message and the second summarized data message, thereby giving rise to a normalized and updated first summarized data message and a normalized second summarized data message; and wherein the re-assembler is configured to reassemble the encoded data message based on the normalized and updated first summarized data message and the normalized second summarized data message.

In some cases, the receiver further comprises: a correlator configured, for each respective punctured data message of the punctured data messages received by the receiver within a flooding waveform during a flooding window, to correlate a distinct training data series associated with a part of the flooding waveform over which the respective punctured data message was received and that is indicative of a time slot of the flooding window during which the respective punctured data message was transmitted with all possible training data series' to identify the time slot of the flooding window during which the respective punctured data message was transmitted.

In accordance with a third aspect of the presently disclosed subject matter, there is provided a transmission method for repeatedly transmitting punctured data messages, the method comprising: for each time slot of two or more consecutive time slots, puncturing an encoded data message with a respective puncture indices series, being a first puncture indices series or a second puncture indices series that is complementary to the first puncture indices series, thereby giving rise to a respective punctured data message having a first code rate that is higher than a second code rate of the encoded data message, the respective punctured data message alternating during the consecutive time slots between a first punctured data message that arises from the puncturing of the encoded data message with the first puncture indices series and a second punctured data message that arises from the puncturing of the encoded data message with the second puncture indices series; and alternately transmitting the first punctured data message and the second punctured data message during the consecutive time slots.

In some cases, the transmission method further comprises: selecting the first puncture indices series or the second puncture indices series for puncturing the encoded data message for each time slot of the consecutive time slots.

In some cases, the first code rate is about 2/3, and the second code rate is about 1/3.

In some cases, the first punctured data message and the second punctured data message are transmitted within a flooding waveform during a flooding window.

In some cases, the flooding window covers at least three consecutive time slots.

In some cases, the transmission method further comprises: for each time slot of the consecutive time slots, modulating a part of the flooding waveform associated with the respective time slot with a distinct training data series that is indicative of the respective time slot.

In accordance with a fourth aspect of the presently disclosed subject matter, there is provided a reception method for reassembling an encoded data message, the method comprising: receiving punctured data messages during two or more consecutive time slots, the punctured data messages including a first punctured data message and a second punctured data message alternately received during the consecutive time slots; and reassembling the encoded data message based on the punctured data messages; wherein the first punctured data message is the encoded data message punctured with a first puncture indices series, wherein the second punctured data message is the encoded data message punctured with a second puncture indices series that is complementary to the first puncture indices series, and wherein each of the punctured data messages has a first code rate that is a higher than a second code rate of the encoded data message.

In some cases, the first code rate is about 2/3, and the second code rate is about 1/3.

In some cases, the punctured data messages are received within a flooding waveform during a flooding window.

In some cases, the flooding window covers at least three consecutive time slots.

In some cases, the reception method further comprises: normalizing the punctured data messages based on a respective SNR measurement of each punctured data message of the punctured data messages, thereby giving rise to normalized data messages.

In some cases, the encoded data message is reassembled based on the normalized data messages.

In some cases, the first punctured data message is received during a first time slot and a third time slot of the consecutive time slots, and the second punctured data message is received during a second time slot of the consecutive time slots, the second time slot being immediately preceded by the first time slot and immediately followed by the third time slot, and the method further comprises: performing a first equal data summarization of the normalized data messages associated with the first punctured data message received during the first time slot and the third time slot, thereby giving rise to a first summarized data message; normalizing the first summarized data message and a normalized data message of the normalized data messages that is associated with the second punctured data message, thereby giving rise to a normalized first summarized data message and a twice normalized second punctured data message; and wherein the reassembling of the encoded data message is based on the normalized first summarized data message and the twice normalized second punctured data message.

In some cases, the second punctured data message is also received during a fourth time slot of the consecutive time slots, the fourth time slot immediately following the third time slot; and the method further comprises: performing: (a) a second equal data summarization of the normalized data messages associated with the first punctured data message received during the first time slot and the third time slot, thereby giving rise to an updated first summarized data message and (b) a third equal data summarization of the normalized data messages associated with the second punctured data message received during the second time slot and the fourth time slot, thereby giving rise to a second summarized data message; normalizing the updated first summarized data message and the second summarized data message, thereby giving rise to a normalized and updated first summarized data message and a normalized second summarized data message; and wherein the reassembling of the encoded data message is based on the normalized and updated first summarized data message and the normalized second summarized data message.

In some cases, the reception method further comprises: for each respective punctured data message of the punctured data messages received within a flooding waveform during a flooding window, correlating a distinct training data series associated with a part of the flooding waveform over which the respective punctured data message was received and that is indicative of a time slot of the flooding window during which the respective punctured data message was transmitted with all possible training data series' to identify the time slot of the flooding window during which the respective punctured data message was transmitted.

In accordance with a fifth aspect of the presently disclosed subject matter, there is provided a non-transitory computer readable storage medium having computer readable program code embodied therewith, the computer readable program code, executable by at least one processor of a computer to perform a transmission method for repeatedly transmitting punctured data messages, the method comprising: for each time slot of two or more consecutive time slots, puncturing an encoded data message with a respective puncture indices series, being a first puncture indices series or a second puncture indices series that is complementary to the first puncture indices series, thereby giving rise to a respective punctured data message having a first code rate that is higher than a second code rate of the encoded data message, the respective punctured data message alternating during the consecutive time slots between a first punctured data message that arises from the puncturing of the encoded data message with the first puncture indices series and a second punctured data message that arises from the puncturing of the encoded data message with the second puncture indices series; and alternately transmitting the first punctured data message and the second punctured data message during the consecutive time slots.

In accordance with a sixth aspect of the presently disclosed subject matter, there is provided a non-transitory computer readable storage medium having computer readable program code embodied therewith, the computer readable program code, executable by at least one processor of a computer to perform a reception method for reassembling an encoded data message, the method comprising: receiving punctured data messages during two or more consecutive time slots, the punctured data messages including a first punctured data message and a second punctured data message alternately received during the consecutive time slots; and reassembling the encoded data message based on the punctured data messages; wherein the first punctured data message is the encoded data message punctured with a first puncture indices series, wherein the second punctured data message is the encoded data message punctured with a second puncture indices series that is complementary to the first puncture indices series, and wherein each of the punctured data messages has a first code rate that is a higher than a second code rate of the encoded data message.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which:

FIGS. 4A to 4D illustrate one example of a sequence of operations for routing punctured data messages within a wireless communications network by flooding, in accordance with the presently disclosed subject matter;

DETAILED DESCRIPTION

Figure 1A:
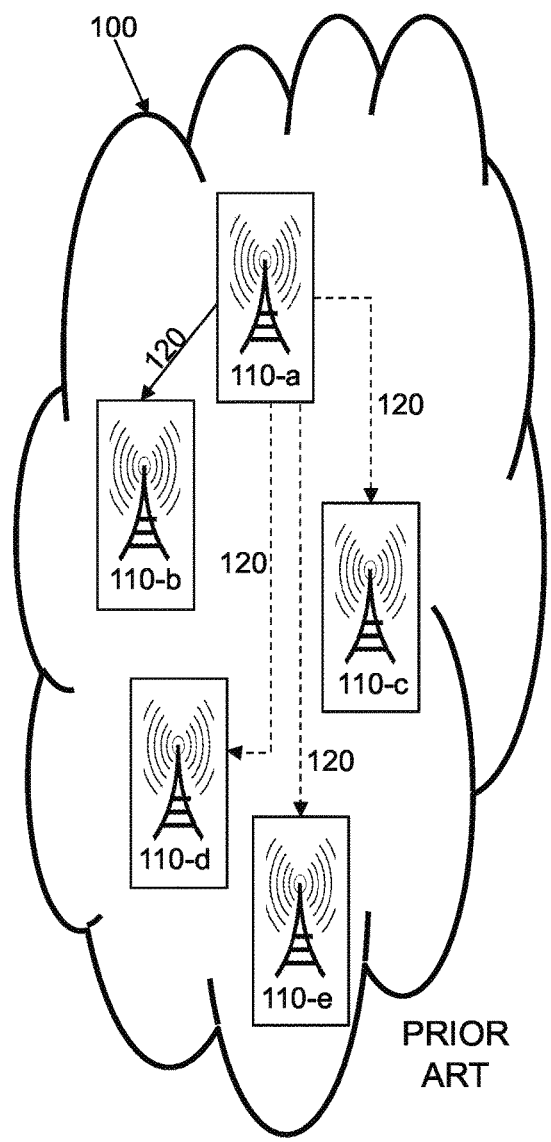
FIGS. 1A to 1D illustrate one example of a known sequence of operations for routing a data message within a wireless communications network by flooding.
Figure 1B:
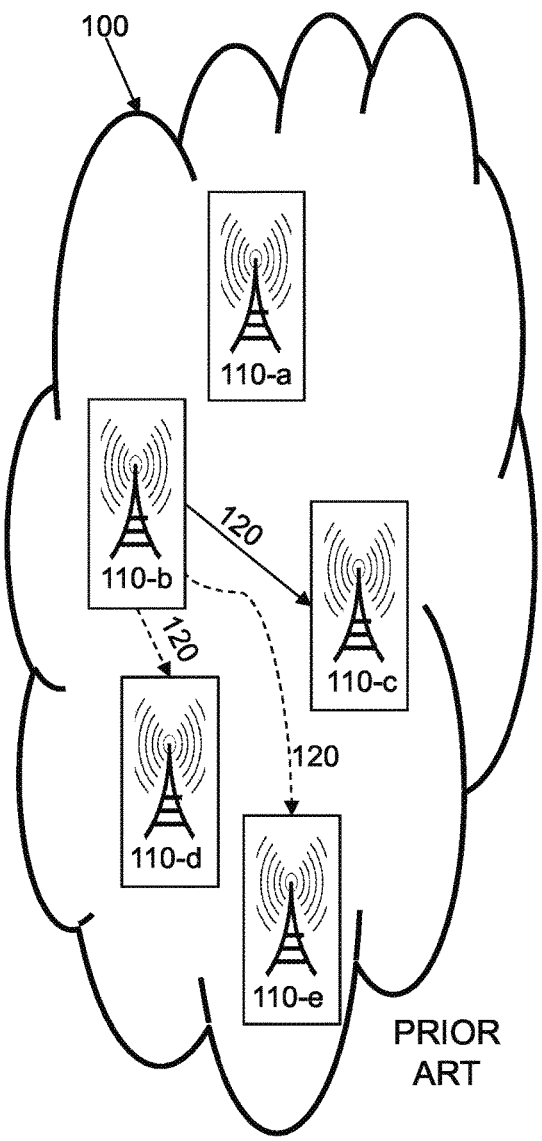
Figure 1C:
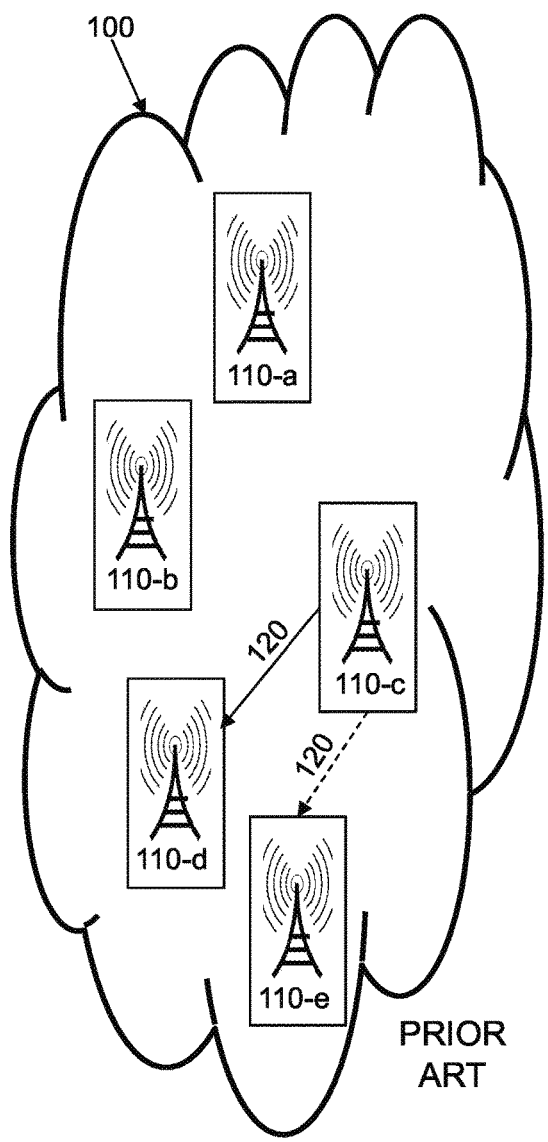
Figure 1D:
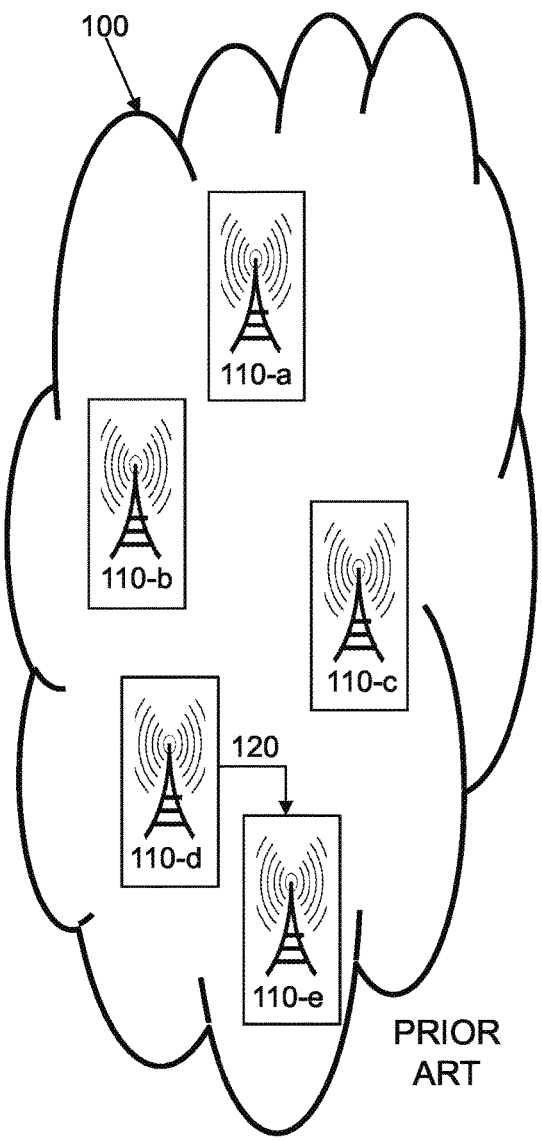

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "transmitting", "puncturing", "selecting", "modulating", "reassembling", "receiving", "normalizing", "performing", "correlating" or the like, include actions and/or processes, including, inter alia, actions and/or processes of a computer, that manipulate and/or transform data into other data, said data represented as physical quantities, e.g. such as electronic quantities, and/or said data representing the physical objects. The terms "computer", "processor", "processing circuitry" and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

In embodiments of the presently disclosed subject matter, fewer, more and/or different stages than those shown in FIGS. 3, 5A to 5C and 6 may be executed. In embodiments of the presently disclosed subject matter one or more stages illustrated in FIGS. 3, 5A to 5C and 6 may be executed in a different order and/or one or more groups of stages may be executed simultaneously. FIGS. 2 and 4A to 4D illustrate a general schematic of the system architecture in accordance with an embodiment of the presently disclosed subject matter. Each module in FIG. 2 can be made up of any combination of software, hardware and/or firmware that performs the functions as defined and explained herein. The modules in FIG. 2 may be centralized in one location or dispersed over more than one location. In other embodiments of the presently disclosed subject matter, the system may comprise fewer, more, and/or different modules than those shown in FIG. 2.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Figure 2:
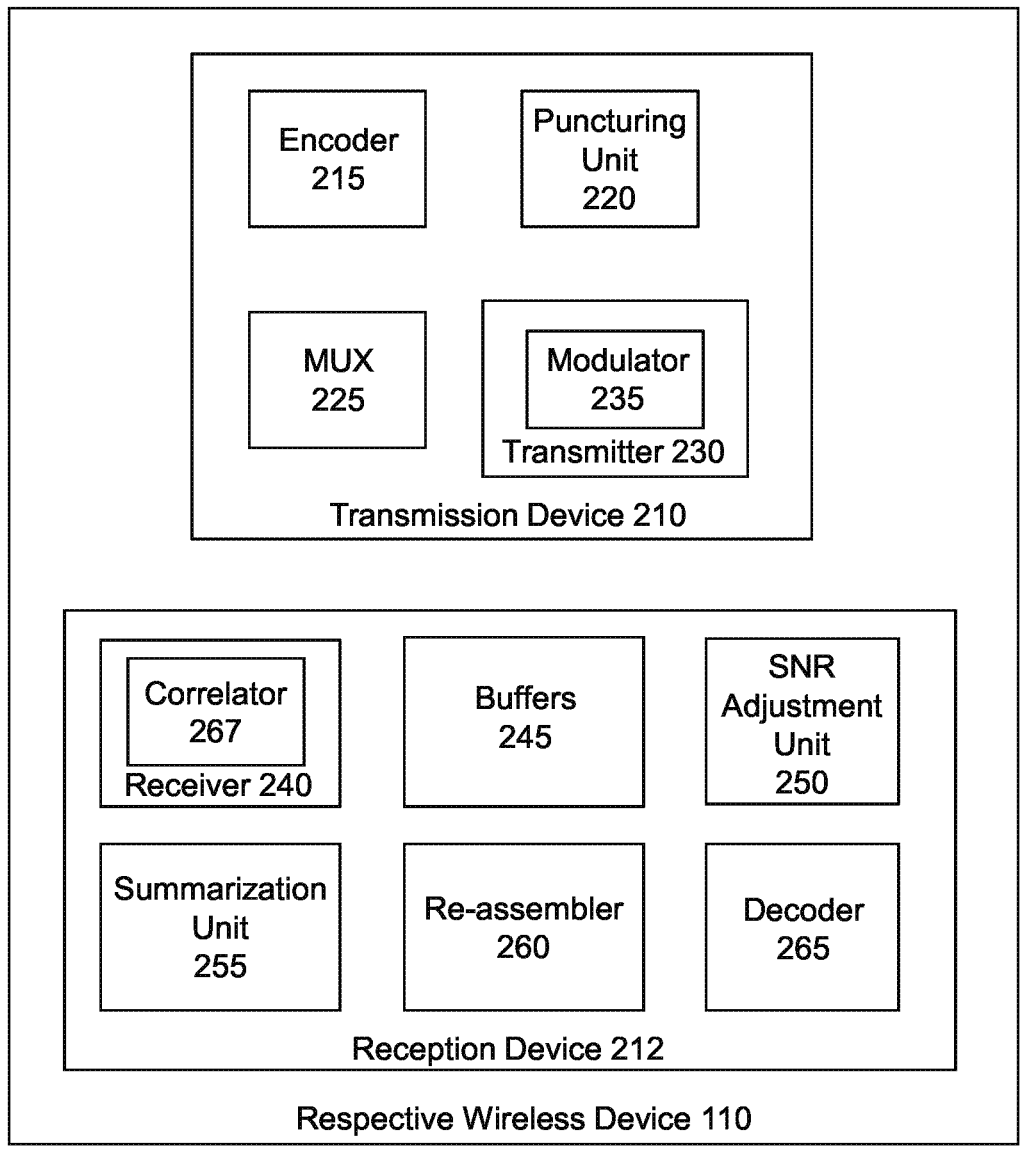
FIG. 2 is a block diagram schematically illustrating one example of a respective wireless device within a wireless communications network, in accordance with the presently disclosed subject matter.

Bearing this is mind, attention is now drawn to FIG. 2, a block diagram schematically illustrating one example of a respective wireless device 110 within a wireless communications network 100, in accordance with the presently disclosed subject matter.

In accordance with the presently disclosed subject matter, respective wireless device 110 can be configured to include a transmission device 210 and a reception device 212.

Transmission device 210 can be configured to transmit two or more punctured data messages having common input bits to at least one other wireless device within the wireless communications network 100 during a corresponding two or more consecutive time slots. In some cases, transmission device 210 can be configured to transmit the punctured data messages as part of a flooding routine, as detailed further herein, inter alia with reference to FIGS. 3 and 4A to 4D.

Transmission device 210 can be configured to include an encoder 215, puncturing unit 220, an optional multiplexer (MUX) 225, and a transmitter 230.

Encoder 215 can be configured to encode given input bits with a forward error correction code (ECC), thereby giving rise to an encoded data message.

Puncturing unit 220 can be configured to puncture the encoded data message with a first puncture indices series, thereby giving rise to a first punctured data message having a first code rate that is higher than a second code rate of the encoded data message. Puncturing unit 220 can be further configured to puncture the encoded data message with a second puncture indices series, thereby giving rise to a second punctured data message having the first code rate, the second puncture indices series being complementary to the first puncture indices series. The first punctured data message and the second punctured data message each include the given input bits.

MUX 225 can be configured to select the first puncture indices series or the second puncture indices series for puncturing the encoded data message. The first puncture indices series and the second puncture indices series can be alternately selected by the MUX 225 during the two or more consecutive time slots in which the punctured data messages are transmitted, such that the puncturing unit 220 alternately outputs the first punctured data message and the second punctured data message during the consecutive time slots.

It is to be noted that, regardless or not of whether the MUX 225 is present, the puncturing unit 220 alternately outputs the first punctured data message and the second punctured data message during the consecutive time slots.

Transmitter 230 can be configured to alternately transmit the first punctured data message and the second punctured data message during the consecutive time slots, based on the output of the puncturing unit 220. As detailed further herein, inter alia with reference to FIG. 5A, a destination wireless device that receives the first punctured data message and the second punctured data message can reassemble the encoded data message having the second code rate. This can improve a capability of the destination wireless device to decode the given input bits. In view thereof, there is no need for the destination wireless device to acknowledge (ACK/NACK) whether or not the given input bits were successfully decoded, and for the transmission device 210 to retransmit the given input bits upon the respective wireless device 110 obtaining an acknowledgement that the given input bits were not successfully decoded (NACK). Put differently, the second punctured data message is transmitted instead of the ACK/NACK, and an additional transmission of the given input bits in the event of a NACK does not occur. This results in a reduction in a number of transmissions within the wireless communications network 100.

Transmitter 230 can be configured to include a modulator 235. Modulator 235 can be configured to modulate a carrier waveform over which the punctured data messages are transmitted.

In some cases, the punctured data messages can be routed through the wireless communications network 100 by flooding. Moreover, in some cases, during the course of a flooding routine, a new wireless device can connect to the wireless communications network 100, and can subsequently receive a punctured data message. In order to enable the new wireless device to synchronize to other wireless devices in the wireless communications network 100, upon receiving the punctured data message, there is a need to transmit the punctured data messages that are routed through the wireless communications network 100 with information that is indicative of a time slot (i.e., hop) of the flooding routine in which the respective punctured data message was transmitted. However, this information cannot be included by adding bits to the punctured data messages, since this would introduce data incoherency in the punctured data messages, and since data coherency is required for a destination wireless device that receives two or more punctured data messages to re-assemble the punctured data messages, prior to the decoding thereof.

In view of the foregoing, in the event that the punctured data messages are transmitted as part of a flooding routine, modulator 235 can be configured, in some cases, to modulate the carrier waveform (i.e., the flooding waveform) over which the transmission device 210 transmits the punctured data messages with a distinct training data series for each punctured data message that is transmitted, the distinct training data series being indicative of a time slot (e.g., hop) of the flooding routine during which the respective punctured data message is transmitted. In this manner, in the event that a new wireless device connects to the wireless communications network 100 during the flooding routine, and subsequently receives a punctured data message, the new wireless device, based on the distinct training data series associated with the punctured data message, can be made aware of a time slot (i.e., hop) of the flooding routine during which the punctured data message was transmitted.

Reception device 212 can be configured to include a receiver 240, buffers 245, optionally a signal-to-noise ratio (SNR) adjustment unit 250, optionally at least one summarization unit 255, a re-assembler 260 and a decoder 265.

Reception device 212 can be configured, using the receiver 240, to receive two or more punctured data messages having common input bits from at least one other wireless device within the wireless communications network 100 during a corresponding two or more consecutive time slots. The punctured data messages include a first punctured data message and a second punctured data message that are alternately received during the consecutive time slots. By alternately receiving the first punctured data message and the second punctured data message during the consecutive time slots, a capability of the reception device 212 to decode the input bits is improved. This improved capability can eliminate the need for the respective wireless device 110 that includes the reception device 212 to acknowledge (ACK/NACK) whether or not the input bits received by the reception device 212 were successfully decoded, thereby reducing a number of transmissions within the wireless communications network 100, as detailed above.

Figure 5A:
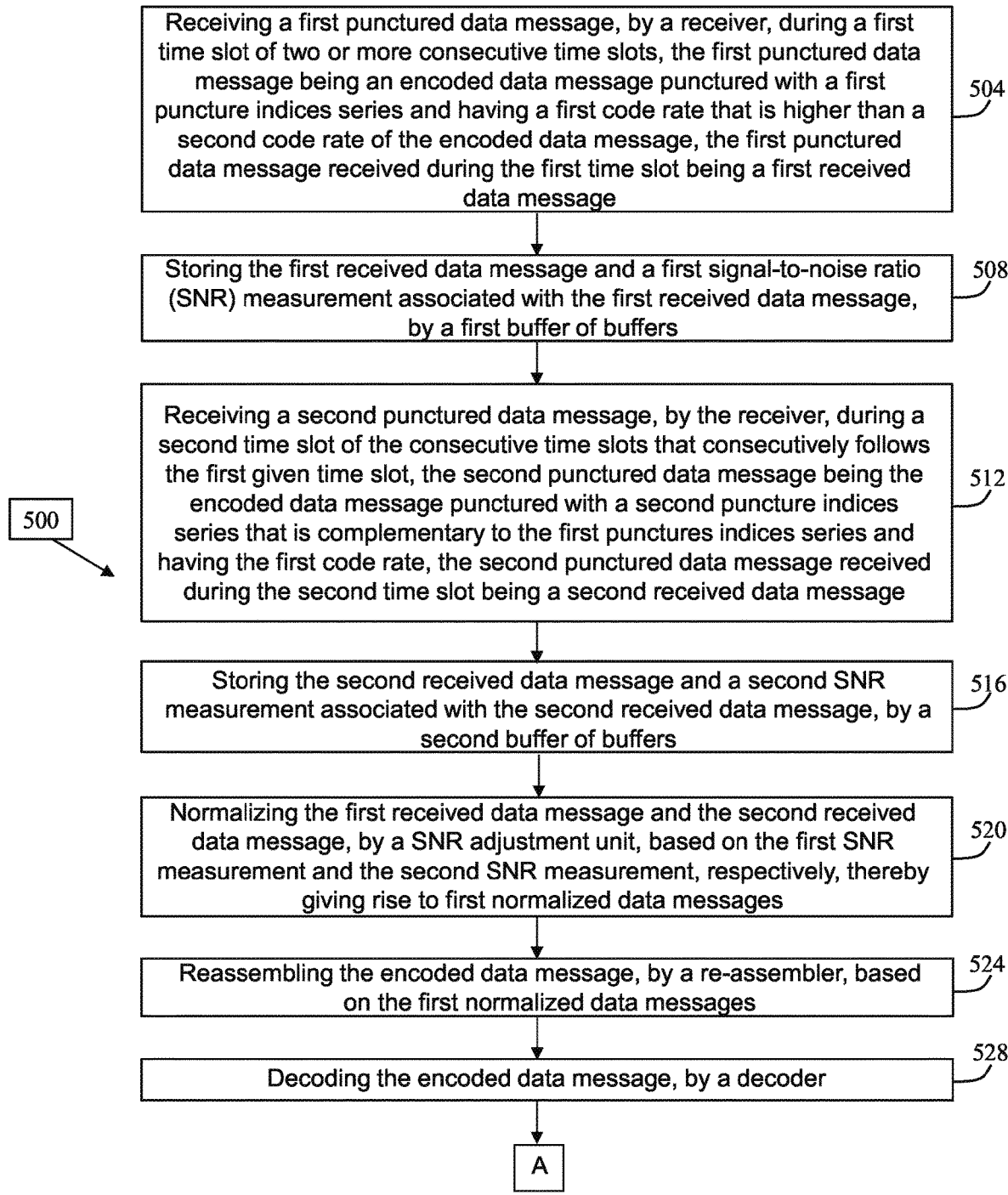
FIGS. 5A to 5C is a flowchart illustrating one example of a sequence of operations performed by a reception device for reassembling an encoded data message based on punctured data messages, in accordance with the presently disclosed subject matter.
Figure 5B:
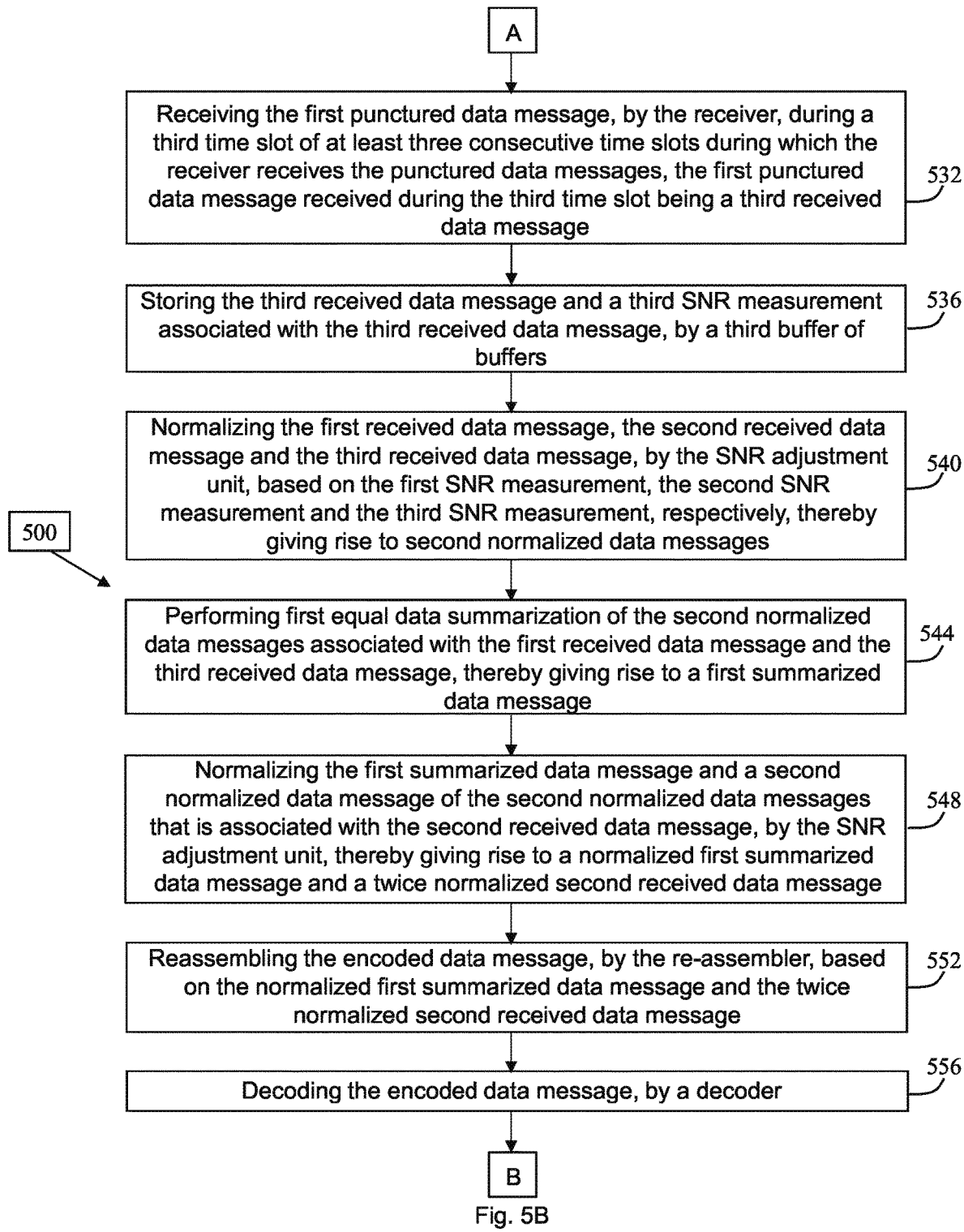
Figure 5C:
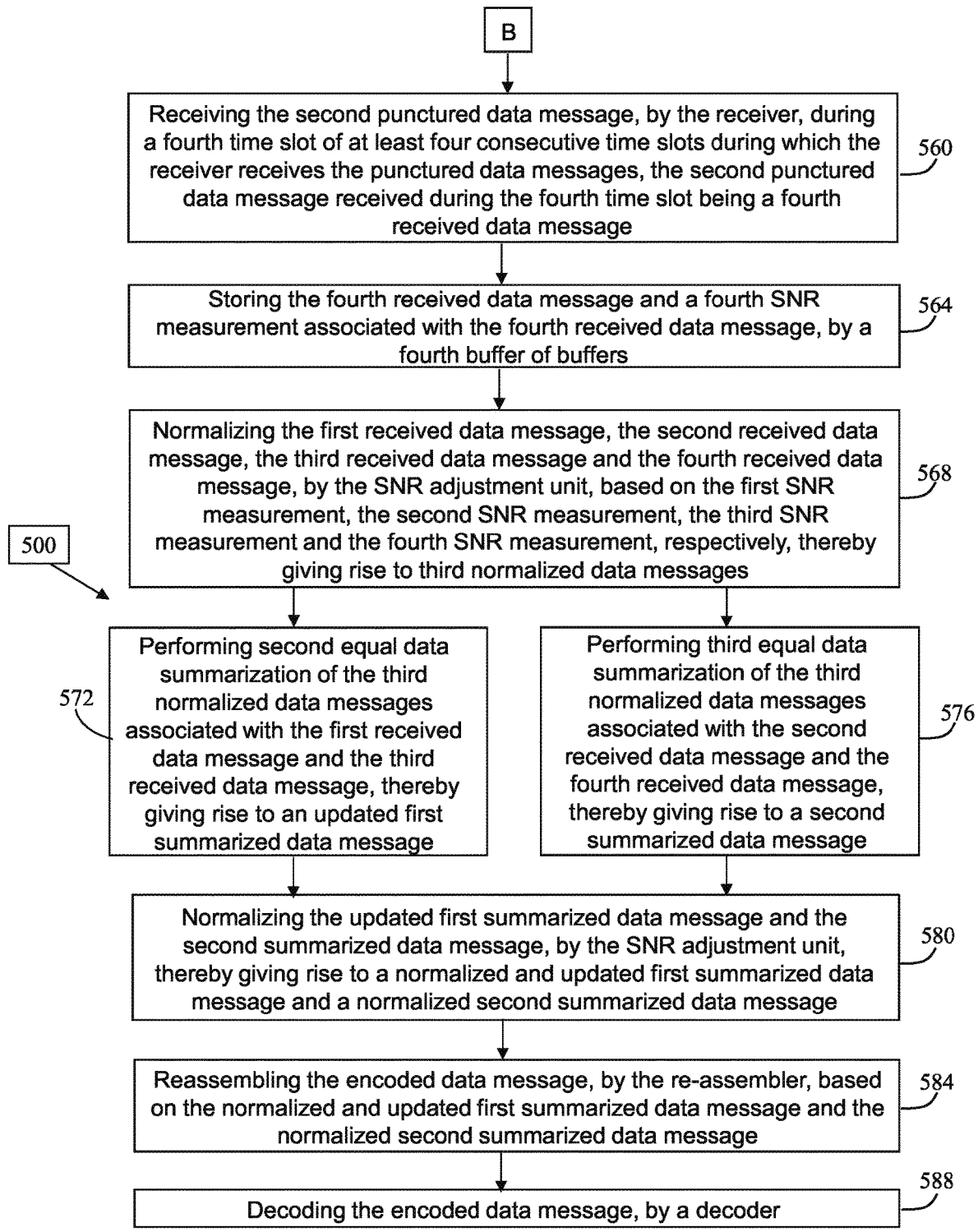

In some cases, reception device 212 can be configured to receive the punctured data messages as part of a flooding routine, as detailed further herein, inter alia with reference to FIGS. 5A to 5C.

Buffers 245 can be configured to store the punctured data messages received by the receiver 240, as detailed further herein, inter alia with reference to FIGS. 5A to 5C.

SNR adjustment unit 250 can be configured to normalize data messages, as detailed further herein, inter alia with reference to FIGS. 5A to 5C.

The summarization unit 255 can be configured to perform equal data summarization of two or more normalized data messages that are generated by normalizing a corresponding two or more punctured data messages that are received by the receiver 240 during a corresponding two or more time slots of the consecutive time slots, as detailed further herein, inter alia with reference to FIGS. 5B and 5C.

Re-assembler 260 can be configured to reassemble an encoded data message based on the punctured data messages that are received by the receiver 240, as detailed further herein, inter alia with reference to FIGS. 5A to 5C.

Decoder 265 can be configured to decode the encoded data message.

In some cases, each punctured data message that is received by a reception device 212 during a flooding routine can be received over a part of a flooding waveform that is modulated with a distinct training data series that is indicative of a time slot (e.g., hop) of the flooding routine during which the respective punctured data message was transmitted. In some cases, receiver 240 can be configured to include a correlator 267, being configured to determine a time slot (e.g., hop) of the flooding routine during which a respective punctured data message that is received by the receiver 240 was transmitted, based on the distinct training data series that is associated with the part of the carrier waveform (i.e., flooding waveform) over which the respective punctured data message was received. Specifically, correlator 267 can be configured to correlate the distinct training data series with all possible training data series' to determine the time slot of the flooding routine during which the respective punctured data message was transmitted. In this manner, in the event that a respective wireless device 110 connects to the wireless communications network 100 during the flooding routine, and a reception device 212 of the respective wireless device 110 subsequently receives a respective punctured data message, the respective wireless device 110 can, using a correlator 267, determine the time slot of the flooding routine during which the respective punctured data message that it receives was transmitted. Since this can be achieved based on a distinct training data series with which the respective punctured data message is modulated, data coherency of the punctured data messages that are received by the reception device 212 of any wireless device can be maintained (i.e., no additional bits have to be added to the punctured data messages), thereby enabling the reception device 212 to perform equal data summarization and re-assembly of an encoded data message, as detailed further herein, inter alia with reference to FIGS. 5A to 5C and FIG. 6, based on the punctured data messages received by the reception device 212.

Figure 3:
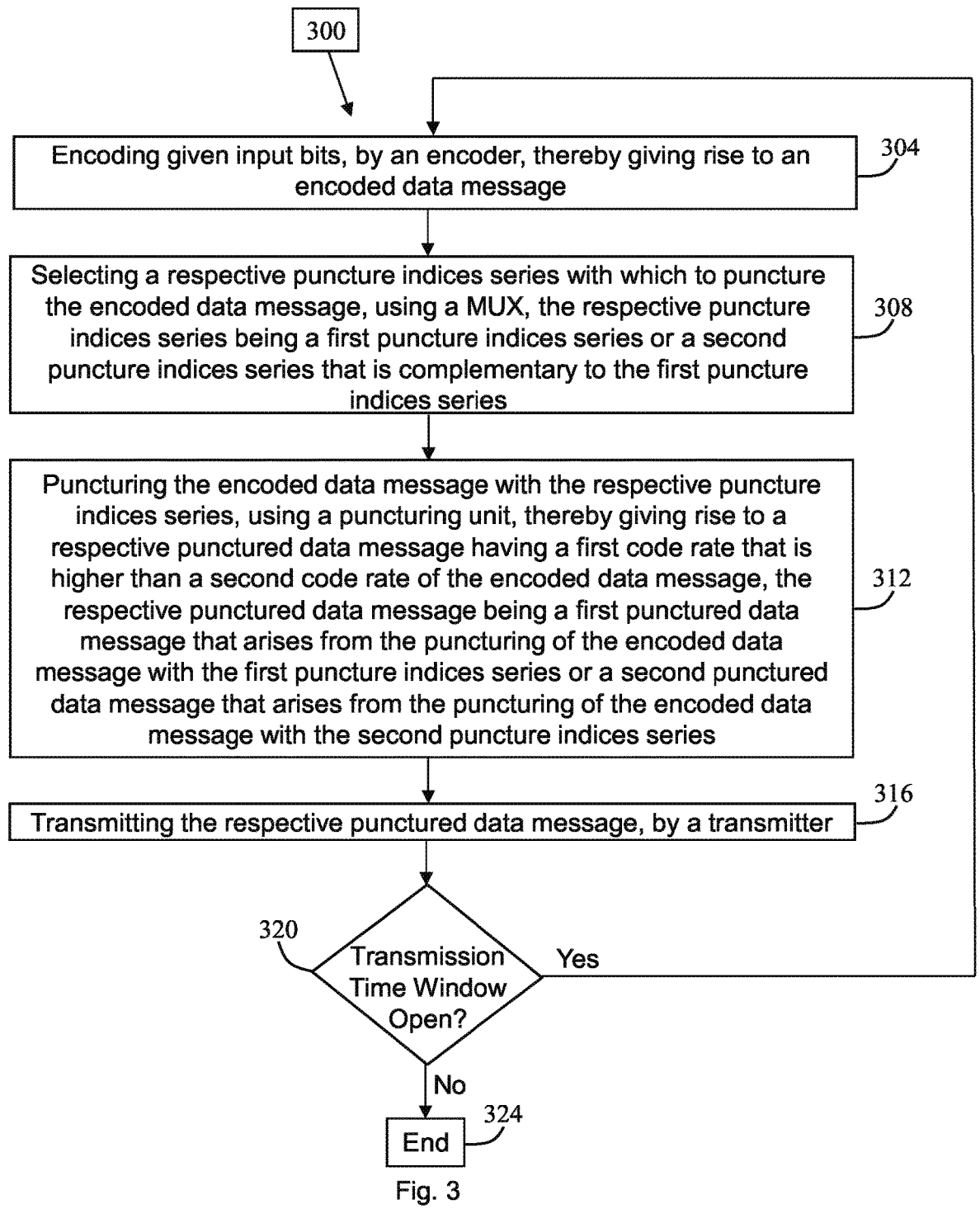
FIG. 3 is a flowchart illustrating one example of a sequence of operations performed by a transmission device for transmitting punctured data messages, in accordance with the presently disclosed subject matter.

Attention is now drawn to FIG. 3, a flowchart illustrating one example of a sequence of operations 300 performed by a transmission device 210 for transmitting punctured data messages, in accordance with the presently disclosed subject matter.

In accordance with the presently disclosed subject matter, transmission device 210 can be configured to encode given input bits, by an encoder 215, thereby giving rise to an encoded data message (block 304).

In some cases, as illustrated in FIG. 3, transmission device 210 can be configured, using a MUX 225, to select a respective puncture indices series with which to puncture the encoded data message, the respective puncture indices series being a first puncture indices series or a second puncture indices series that is complementary to the first puncture indices series (block 308). The respective puncture indices series that is selected for puncturing the encoded data message alternates between the first punctured indices series and the second punctured indices series during two or more consecutive time slots.

Transmission device 210 can be further configured, using puncturing unit 220, to puncture the encoded data message with the respective puncture indices series, thereby giving rise to a respective punctured data message having a first code rate that is higher than a second code rate of the encoded data message, the respective punctured data message being a first punctured data message that arises from the puncturing of the encoded data message with the first puncture indices series or a second punctured data message that arises from the puncturing of the encoded data message with the second puncture indices series (block 312). The respective punctured data message alternates between the first punctured data message and the second punctured data message during the consecutive time slots, e.g. in accordance with the respective puncture indices series that is selected by MUX 225.

In some cases, the first code rate is about 2/3, and the second code rate is about 1/3.

Transmission device 210 can be configured, using transmitter 230, to transmit the respective punctured data message (block 316).

In the event that a time window (e.g., a flooding window) for transmitting punctured data messages having the given input bits is still open (block 320), i.e. there are additional time slots during which punctured data messages are to be transmitted, transmission device 210 can be configured to repeat performing the sequence of operations set forth in blocks 304-316. As detailed earlier herein, inter alia with reference to FIG. 2, the first punctured data message and the second punctured data message are alternately transmitted during the two or more consecutive time slots.

In some cases in which a single respective wireless device 110 solely transmits the punctured data messages, the first punctured data message and the second punctured data message can be alternately transmitted during two consecutive time slots.

In some cases, as detailed earlier herein, inter alia with reference to FIG. 2, transmission device 210 can be configured to transmit the punctured data messages as part of a flooding routine. The punctured data messages can be transmitted within a flooding waveform during a flooding window that covers two or more consecutive time slots (i.e., hops). In some cases, the flooding window can cover at least three consecutive time slots (i.e., hops).

In the event that a time window (e.g., a flooding window) for transmitting punctured data messages having the given input bits has closed, the sequence of operations set forth in blocks 304-316 is not repeated (block 324).

Attention is now drawn to FIGS. 4A to 4D, an illustration of one example of a sequence of operations for routing punctured data messages within a wireless communications network 100 by flooding, in accordance with the presently disclosed subject matter.

Figure 4A:
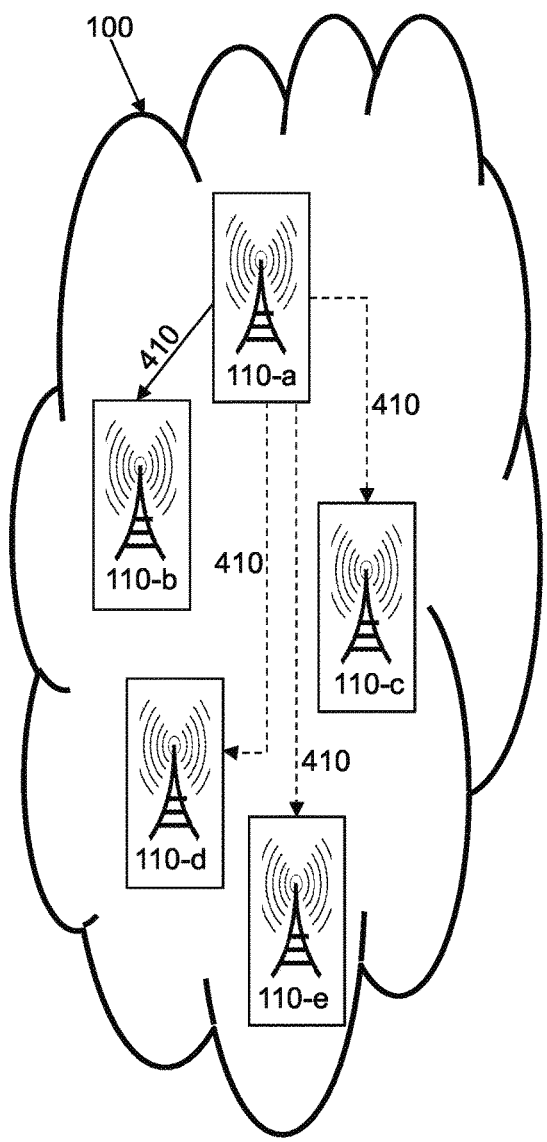

In accordance with the presently disclosed subject matter, as part of a flooding routine, a source wireless device 110-*a* can be configured to transmit a flooding waveform that covers two or more consecutive time slots, for example four consecutive time slots, as illustrated in FIGS. 4A to 4D. During a first time slot of the consecutive time slots, source wireless device 110-*a* can be configured to transmit a first punctured data message 410 to all of the destination wireless devices (e.g., 110-*b*, 110-*c*, 110-*d*, 110-*e*) in the wireless communications network 100 that are linked to the source wireless device 110-*a*, as illustrated in FIG. 4A.

At least one first destination wireless device (e.g., 110-*b*) of the destination wireless devices (e.g., 110-*b*, 110-*c*, 110-*d*, 110-*e*) receives the first punctured data message 410 that is transmitted by the source wireless device (e.g., 110-*a*) during the first time slot of the consecutive time slots, as illustrated by the solid arrow between the source wireless device 110-*a* and the first destination wireless device 110-*b* in FIG. 4A (as opposed to the dotted arrows between the source wireless device 110-*a* and the other destination wireless devices 110-*c*, 110-*d* and 110-*e*).

Figure 4B:
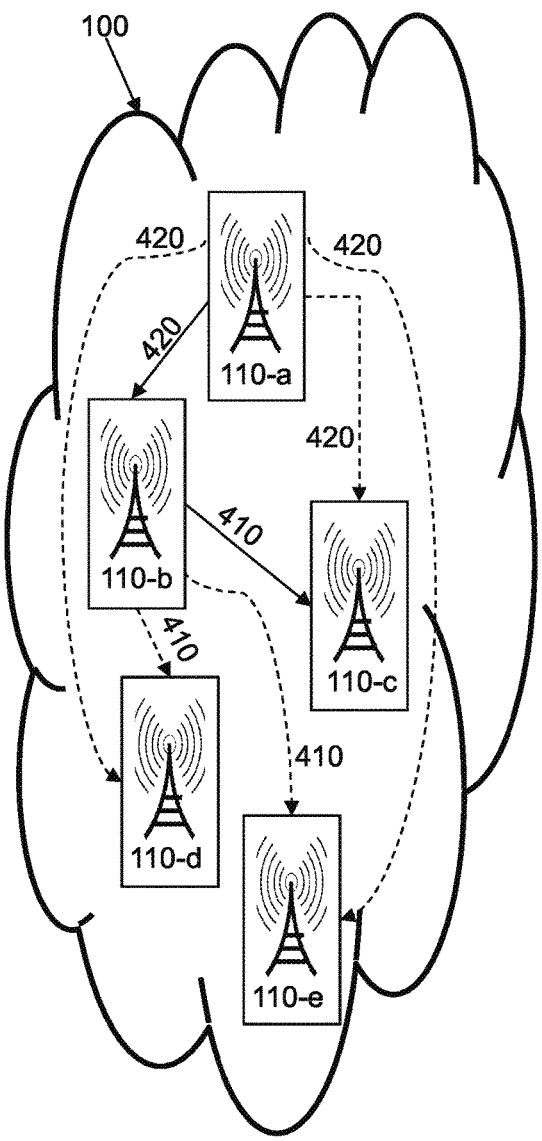

During a second time slot of the consecutive time slots, and as illustrated in FIG. 4B, the first destination wireless device 110-*b* can be configured to transmit the first punctured data message 410 that it received from the source wireless device 110-*a* to the destination wireless devices (e.g., 110-*c*, 110-*d*, 110-*e*) that are linked to the first destination wireless device 110-*b*, as in a conventional flooding routine. However, contrary to a conventional flooding routine, source wireless device 110-*a* can be configured, during the second time slot, to transmit a second punctured data message 420 to the destination wireless devices (e.g., 110-*b*, 110-*c*, 110-*d*, 110-*e*) that are linked to the source wireless device 110-*a*, as illustrated in FIG. 4B.

At least one second destination wireless device (e.g., 110-*c*) of the destination wireless devices (e.g., 110-*c*, 110-*d*, 110-*e*) that are linked to the first destination wireless device 110-*b* receives the first punctured data message 410 that is transmitted by the first destination wireless device 110-*b* during the second time slot of the consecutive time slots, as illustrated by the solid arrow in FIG. 4B between the first destination wireless device 110-*b* and the second destination wireless device 110-*c*. Moreover, the first destination wireless device 110-*b* receives the second punctured data message 420 that is transmitted by the source wireless device 110-*a* during the second time slot of the consecutive time slots, as illustrated by the solid arrow in FIG. 4B between the source wireless device 110-*a* and the first destination wireless device 110-*b*. By receiving the first punctured data message 410 transmitted by the source wireless device 110-*a* during the first time slot and the second punctured data message 420 transmitted by the source wireless device 110-*a* during the second time slot, first destination wireless device 110-*b* can be configured to reassemble the encoded data message based on the first punctured data message 410 and the second punctured data message 420, as detailed further herein, inter alia with reference to FIG. 5A. In this manner, first destination wireless device 110-*b* can achieve an improved reception performance.

During a third time slot of the consecutive time slots, and as illustrated in FIG. 4C, the second destination wireless device 110-*c* can be configured to transmit the first punctured data message 410 that it received from the first destination wireless device 110-*b* during the second time slot to other destination wireless devices (e.g., 110-*d*, 110-*e*) that are linked to the second destination wireless device 110-*c*, not including the first destination wireless device 110-*b*, as in a conventional flooding routine. However, contrary to a conventional flooding routine, and as illustrated in FIG. 4C, source wireless device 110-*a* can be configured, during the third time slot, to transmit the first punctured data message 410 to the destination wireless devices that are linked to the source wireless device 110-*a*. Moreover, contrary to a conventional flooding routine, and as illustrated in FIG. 4C, first destination wireless device 110-*b* can be configured, during the third time slot, to transmit the second punctured data message 420 that it received from source wireless device 110-*a* during the second time slot of the consecutive time slots to the destination wireless devices (e.g., 110-*c*, 110-*d*, 110-*e*) that are linked to the first destination wireless device 110-*b*.

At least one third destination wireless device (e.g., 110-*d*) of the destination wireless devices (e.g., 110-*d*, 110-*e*) that are linked to the second destination wireless device 110-*c*, not including the first destination wireless device 110-*b*, receives the first punctured data message 410 that is transmitted by the second destination wireless device 110-*c* during the third time slot of the consecutive time slots, as illustrated by the solid arrow in FIG. 4C between the second destination wireless device 110-*c* and the third destination wireless device 110-*d*.

Moreover, the second destination wireless device 110-*c* receives the second punctured data message 420 that is transmitted by the first destination wireless device (e.g., 110-*b*) during the third time slot, as illustrated by the solid arrow in FIG. 4C between the first destination wireless device 110-*b* and the second destination wireless device 110-*c*. By receiving the first punctured data message 410 and the second punctured data message 420 that is transmitted by the first destination wireless device 110-*b* during the second time slot and the third time slot, respectively, second destination wireless device 110-*c* can be configured to reassemble the encoded data message based on the first punctured data message 410 and the second punctured data message 420, as detailed further herein, inter alia with reference to FIG. 5A. In this manner, second destination wireless device 110-*c* can achieve an improved reception performance.

In addition, the first destination wireless device 110-*b* receives the first punctured data message that is transmitted by the source wireless device 110-*a* during the third time slot, as illustrated by the solid arrow in FIG. 4C between the source wireless device 110-*a* and the first destination wireless device 110-*b*. First destination wireless device 110-*b* can be configured to reassemble the encoded data message based on the first punctured data messages transmitted by the source wireless device 110-*a* to the first destination wireless device 110-*b* during the first and third time slots, and based on the second punctured data message transmitted by the source wireless device 110-*a* to the first destination wireless device 110-*b* during the second time slot, as detailed further herein, inter alia with reference to FIG. 5B. In this manner, first destination wireless device 110-*b* can further improve its reception performance.

During a fourth time slot of the consecutive time slots, and as illustrated in FIG. 4D, the third destination wireless device 110-*d* can be configured to transmit the first punctured data message 410 that it received from the second destination wireless device 110-*c* during the third time slot to at least one fourth destination wireless device (e.g., 110-*e*) that is linked to the third destination wireless device 110-*d*, as in a conventional flooding routine. However, contrary to a conventional flooding routine, and as illustrated in FIG. 4D, source wireless device 110-*a* can be configured, during the fourth time slot, to transmit the second punctured data message 420 to destination wireless devices that are linked to the source wireless device 110-*a*. Moreover, contrary to a conventional flooding routine, and as illustrated in FIG. 4D, first destination wireless device 110-*b* can be configured, during the fourth time slot, to transmit the first punctured data message 410 that it received from source wireless device 110-*a* during the third time slot of the consecutive time slots to destination wireless devices (e.g., 110-*c*, 110-*d*, 110-*e*) that are linked to the first destination wireless device 110-*b*. In addition, contrary to a conventional flooding routine, and as illustrated in FIG. 4D, second destination wireless device 110-*c* can be configured, during the fourth time slot, to transmit the second punctured data message 420 that it received from first destination wireless device 110-*b* during the third time slot of the consecutive time slots to destination wireless devices (e.g., 110-*d*, 110-*e*) that are linked to the second destination wireless device 110-*c*.

At least one fourth destination wireless device (e.g., 110-*e*) of the destination wireless devices that are linked to the third destination wireless device 110-*d*, not including the first destination wireless device 110-*b* and the second destination wireless device 110-*c*, receives the first punctured data message 410 that is transmitted by the third destination wireless device 110-*d* during the fourth time slot of the consecutive time slots, as illustrated by the solid arrow in FIG. 4D between the third destination wireless device 110-*d* and the fourth destination wireless device 110-*e*.

Moreover, the third destination wireless device 110-*d* receives the second punctured data message 420 that is transmitted by the second destination wireless device (e.g., 110-*c*) during the fourth time slot, as illustrated by the solid arrow in FIG. 4D between the second destination wireless device 110-*c* and the third destination wireless device 110-*d*. By receiving the first punctured data message 410 and the second punctured data message 420 that is transmitted by the second destination wireless device 110-*c* during the third time slot and the fourth time slot, respectively, third destination wireless device 110-*d* can be configured to reassemble the encoded data message based on the first punctured data message 410 and the second punctured data message 420, as detailed further herein, inter alia with reference to FIG. 5A. In this manner, third destination wireless device 110-*d* can achieve an improved reception performance.

In addition, the second destination wireless device 110-*c* receives the first punctured data message 410 that is transmitted by the first destination wireless device 110-*b* during the fourth time slot, as illustrated by the solid arrow in FIG. 4D between the first destination wireless device 110-*b* and the second destination wireless device 110-*c*. Second destination wireless device 110-*c* can be configured to reassemble the encoded data message based on the first punctured data messages transmitted by the first destination wireless device 110-*b* to the second destination wireless device 110-*c* during the second and fourth time slots, and based on the second punctured data message transmitted by the first destination wireless device 110-*b* to the second destination wireless device 110-*c* during the third time slot, as detailed further herein, inter alia with reference to FIG. 5B. In this manner, second destination wireless device 110-*c* can achieve an improved reception performance.

Furthermore, the first destination wireless device 110-*b* receives the second punctured data message that is transmitted by the source wireless device 110-*a* during the fourth time slot, as illustrated by the solid arrow in FIG. 4D between the source wireless device 110-*a* and the first destination wireless device 110-*b*. First destination wireless device 110-*b* can be configured to reassemble the encoded data message based on the first punctured data messages 410 transmitted by the source wireless device 110-*a* to the first destination wireless device 110-*b* during the first and third time slots, and based on the second punctured data messages 420 transmitted by the source wireless device 110-*a* to the first destination wireless device 110-*b* during the second and fourth time slots, as detailed further herein, inter alia with reference to FIG. 5C. In this manner, first destination wireless device 110-*b* can further improve its reception performance.

Attention is now drawn to FIGS. 5A to 5C, a flowchart illustrating one example of a sequence of operations performed by a reception device 212 for reassembling an encoded data message based on punctured data messages, in accordance with the presently disclosed subject matter.

In accordance with the presently disclosed subject matter, a receiver 240 of a reception device 212 can be configured to receive a first punctured data message 410 during a first time slot of two or more consecutive time slots, the first punctured data message 410 being an encoded data message punctured with a first puncture indices series and having a first code rate that is higher than a second code rate of the encoded data message, the first punctured data message 410 received during the first time slot being a first received data message (block 504).

A first buffer of buffers 245 can be configured to store the first received data message. In some cases, as illustrated in FIG. 5A, the first buffer can be further configured to store a first signal-to-noise ratio (SNR) measurement associated with the first received data message (block 508).

Receiver 240 can be further configured to receive a second punctured data message 420 during a second time slot of the consecutive time slots that consecutively follows the first time slot, the second punctured data message 420 being the encoded data message punctured with a second puncture indices series that is complementary to the first punctures indices series and having the first code rate, the second punctured data message received during the second time slot being a second received data message (block 512).

A second buffer of buffers 245 can be configured to store the second received data message. In some cases, as illustrated in FIG. 5A, the second buffer can be further configured to store a second SNR measurement associated with the second received data message (block 516).

In some cases, a SNR adjustment unit 250 can be configured to normalize the first received data message and the second received data message, based on the first SNR measurement and the second SNR measurement, respectively, thereby giving rise to first normalized data messages (block 520). The higher SNR data message from among the first received data message and the second received data message, being the received data message that is associated with a higher SNR measurement, is normalized by multiplying the higher SNR data message by a weight of 1, or put differently, by maintaining the higher SNR data message unchanged. Moreover, the lower SNR data message from among the first received data message and the second received data message, being the received data message that is associated with a lower SNR measurement, is linearly normalized. For example, if the SNR measurement of the lower SNR data message is 90% of the SNR measurement of the higher SNR data message, the lower SNR message can be multiplied by a weight of 0.9. By linearly normalizing the lower SNR data message while maintaining the higher SNR data message unchanged, a performance of the re-assembler 260 can be improved.

In some cases, in which the punctured data messages are transmitted within a flooding waveform during a flooding window that covers at least three consecutive hops, the first received data message and the second received data message are normalized, thereby giving rise to the first normalized data messages.

It is to be noted that the first received data message and the second received data message can be normalized in the event that the punctured data messages are transmitted during a time window (e.g., a flooding window) that covers only two consecutive time slots (e.g., hops).

A re-assembler 260 can be configured to reassemble the encoded data message. In some cases, in which SNR adjustment unit 250 generates the first normalized data messages, the re-assembler 260 can be configured to reassemble the encoded data message based on the first normalized data messages (block 524). Alternatively, in some cases, the re-assembler 260 can be configured to reassemble the encoded data message based on the first received data message and the second received data message.

A decoder 265 can be configured to decode the encoded data message (block 528).

Turning now to FIG. 5B, being a continuation of the flow in FIG. 5A, in the event that the reception device 212 receives the punctured data messages as part of a flooding routine, and a flooding waveform received by the reception device 212 covers at least three consecutive time slots, the reception device 212 can be configured to reassemble the encoded data message based on the punctured data messages that are transmitted during the first three consecutive time slots of the flooding waveform that is received by the reception device 212, as illustrated in FIG. 5B.

As illustrated in FIG. 5B, receiver 240 can be configured, following reception of the first received data message and the second received data message during a first time slot and a second time slot of the first three consecutive time slots of the flooding waveform that is received by the reception device 212, to receive the first punctured data message 410 during a third time slot of the first three consecutive time slots, the first punctured data message 410 received during the third time slot being a third received data message (block 532).

A third buffer of the buffers 245 can be configured to store the third received data message and a third SNR measurement associated with the third received data message (block 536).

SNR adjustment unit 250 can be configured to normalize the first received data message, the second received data message and the third received data message, based on the first SNR measurement, the second SNR measurement and the third SNR measurement, respectively, thereby giving rise to second normalized data messages (block 540). The highest SNR data message from among the first received data message, the second received data message and the third received data message, being the received data message that is associated with a highest SNR measurement, is normalized by multiplying the highest SNR data message by a weight of 1, or put differently, by maintaining the highest SNR data message unchanged. Moreover, the remaining data messages from among the first received data message, the second received data message and the third received data message are linearly normalized. For example, assume that the first received data message is the highest SNR data message, the second received data message has an SNR measurement that is 90% of the SNR measurement of the highest SNR data message, and the third receive data message has an SNR measurement that is 60% of the SNR measurement of the highest SNR data message. In this example, the second received data message can be multiplied by a weight of 0.9, and the third received data message can be multiplied by a weight of 0.6. By linearly normalizing the remaining data messages while maintaining the highest SNR data message unchanged, a reception quality of the highest SNR data message will not be damaged when the encoded data message is reassembled by the re-assembler 260.

Summarization unit 255 can be configured to perform first equal data summarization of the second normalized data messages associated with the first received data message and the third received data message, thereby giving rise to a first summarized data message (block 544).

SNR adjustment unit 250 can be configured to normalize the first summarized data message and a second normalized data message of the second normalized data messages that is associated with the second received data message, thereby giving rise to a normalized first summarized data message and a twice normalized second received data message (block 548). The higher SNR data message from among the first summarized data message and the second normalized data message that is associated with the second received data message, being the data message that is associated with a higher SNR measurement, is normalized by multiplying the higher SNR data message by a weight of 1, or put differently, by maintaining the higher SNR data message unchanged. Moreover, the lower SNR data message from among the first summarized data message and the second normalized data message that is associated with the second received data message, being the data message that is associated with a lower SNR measurement, is linearly normalized. For example, if the SNR measurement of the lower SNR data message is 90% of the SNR measurement of the higher SNR data message, the lower SNR data message can be multiplied by a weight of 0.9. By linearly normalizing the lower SNR data message while maintaining the higher SNR data message unchanged, a performance of the re-assembler 260 can be improved. By linearly normalizing the lower SNR data message while maintaining the higher SNR data message unchanged, a reception quality of the higher SNR data message will not be damaged when the encoded data message is reassembled by the re-assembler 260.

Re-assembler 260 can be configured to reassemble the encoded data message, based on the normalized first summarized data message and the twice normalized second received data message (block 552).

Decoder 265 can be configured to decode the encoded data message (block 556).

Turning now to FIG. 5C, being a continuation of the flow in FIG. 5B, in the event that the flooding waveform received by the reception device 212 covers at least four consecutive time slots, the reception device 212 can be configured to reassemble the encoded data message based on the punctured data messages that are transmitted during the first four consecutive time slots, as illustrated in FIG. 5C.

As illustrated in FIG. 5C, receiver 240 can be configured to receive the second punctured data message 420 during a fourth time slot of the at least four consecutive time slots, the second punctured data message 420 received during the fourth time slot being a fourth received data message (block 560).

A fourth buffer of the buffers 245 can be configured to store the fourth received data message and a fourth SNR measurement associated with the fourth received data message (block 564).

SNR adjustment unit 250 can be configured to normalize the first received data message, the second received data message, the third received data message and the fourth received data message, based on the first SNR measurement, the second SNR measurement, the third SNR measurement and the fourth SNR measurement, respectively, thereby giving rise to third normalized data messages (block 568). The highest SNR data message from among the first received data message, the second received data message, the third received data message and the fourth received data message, being the received data message that is associated with a highest SNR measurement, is normalized by multiplying the highest SNR data message by a weight of 1, or put differently, by maintaining the highest SNR data message unchanged. Moreover, the remaining data messages from among the first received data message, the second received data message, the third received data message and the fourth received data message are linearly normalized. For example, assume that the fourth received data message is the highest SNR data message, the first received data message has an SNR measurement that is 90% of the SNR measurement of the highest SNR data message, the second received data message has an SNR measurement that is 81% of the SNR measurement of the highest SNR data message, and the third received data message has an SNR measurement that is 54% of the SNR measurement of the highest SNR data message. In this example, the first received data message can be multiplied by a weight of 0.9, the second received data message can be multiplied by a weight of 0.81, and the third received data message can be multiplied by a weight of 0.54. By linearly normalizing the remaining data messages while maintaining the highest SNR data message unchanged first received data message, the second received data message the third received data message and the fourth received data message, a reception quality of the highest SNR data message will not be damaged when the encoded data message is reassembled by the re-assembler 260.

Summarization unit 255 can be configured to perform second equal data summarization of the third normalized data messages associated with the first received data message and the third received data message, thereby giving rise to an updated first summarized data message (block 572). Summarization unit 255 can be further configured to perform third equal data summarization of the third normalized data messages associated with the second received data message and the fourth received data message, thereby giving rise to a second summarized data message (block 576).

SNR adjustment unit 250 can be configured to normalize the updated first summarized data message and the second summarized data message, thereby giving rise to a normalized and updated first summarized data message and a normalized second summarized data message (block 580). The higher SNR data message from among the updated first summarized data message and the second summarized data message, being the data message that is associated with a higher SNR measurement, is normalized by multiplying the higher SNR data message by a weight of 1, or put differently, by maintaining the higher SNR data message unchanged. Moreover, the lower SNR data message from among the updated first summarized data message and the second summarized data message, being the data message that is associated with a lower SNR measurement, is linearly normalized. For example, if the SNR measurement of the lower SNR data message is 90% of the SNR measurement of the higher SNR data message, the lower SNR message can be multiplied by a weight of 0.9. By linearly normalizing the lower SNR data message while maintaining the higher SNR data message unchanged, a performance of the re-assembler 260 can be improved. By linearly normalizing the lower SNR data message, a reception quality of the higher SNR data message will not be damaged when the encoded data message is reassembled by the re-assembler 260.

Re-assembler 260 can be configured to reassemble the encoded data message, based on the normalized and updated first summarized data message and the normalized second summarized data message (block 584).

Decoder 265 can be configured to decode the encoded data message (block 588).

Figure 6:
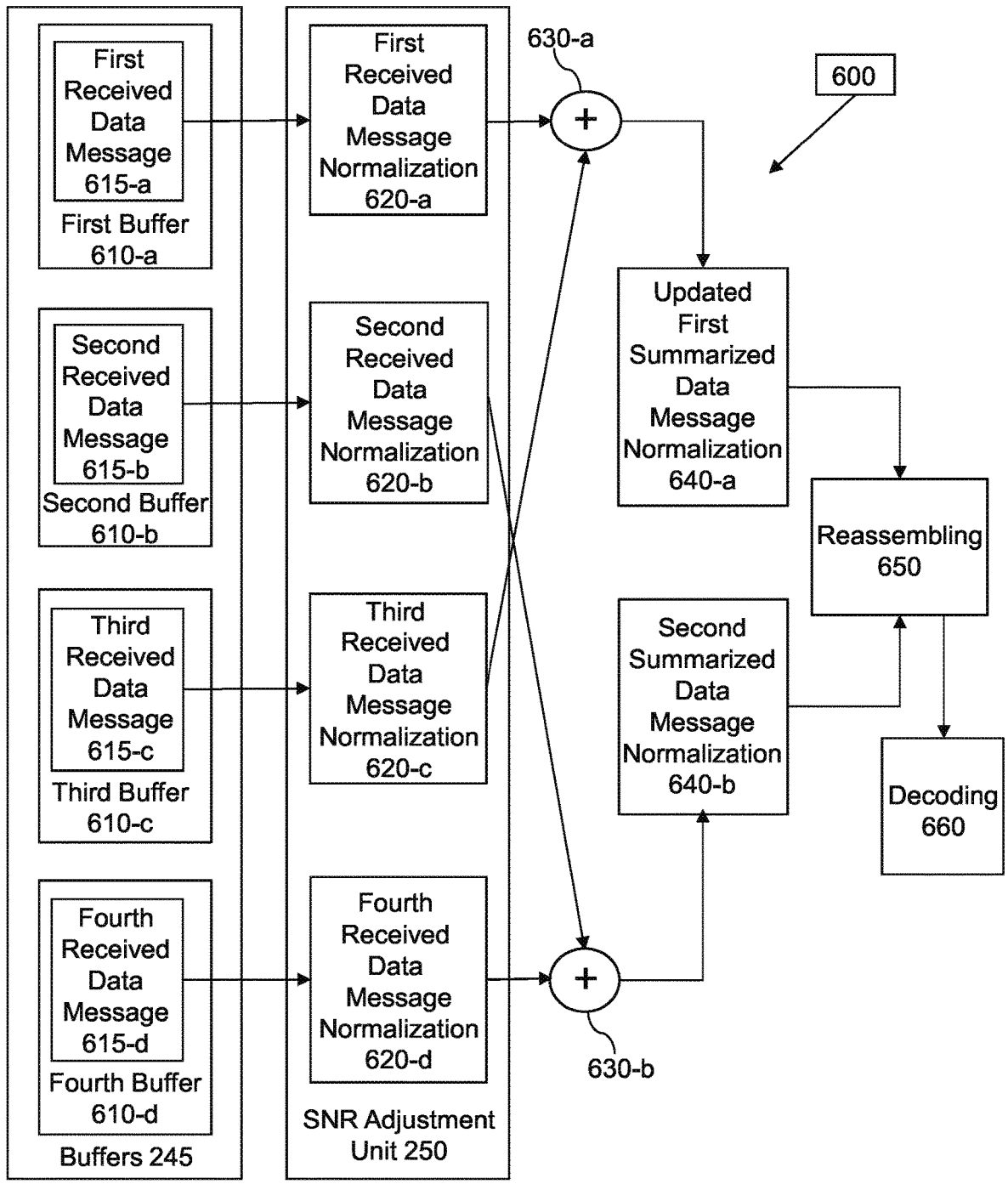
FIG. 6 is a block diagram schematically illustrating one example of operations performed by a reception device for reassembling an encoded data message based on punctured data messages that are received by the reception device over four consecutive time slots during a flooding routine, in accordance with the presently disclosed subject matter.

Attention is now drawn to FIG. 6, a block diagram schematically illustrating one example of operations performed by a reception device 212 for reassembling an encoded data message based on punctured data messages that are received by the reception device 212 over four consecutive time slots during a flooding routine, in accordance with the presently disclosed subject matter.

In accordance with the presently disclosed subject matter, a first buffer 610-*a* of buffers 245 of the reception device 212 can be configured to store a first received data message 615-*a*, being a first punctured data message 410 that is received by the receiver 240 of the reception device 212 during a first time slot of the consecutive time slots. A second buffer 610-*b* of buffers 245 can be configured to store a second received data message 615-*b*, being a second punctured data message 420 that is received by the receiver 240 during a second time slot of the consecutive time slots. A third buffer 610-*c* of buffers 245 can be configured to store a third received data message 615-*c*, being a first punctured data message 410 that is received by the receiver 240 during a third time slot of the consecutive time slots. A fourth buffer 610-*d* of buffers 245 can be configured to store a fourth received data message 615-*d*, being a second punctured data message 420 that is received by the receiver 240 during a fourth time slot of the consecutive time slots.

SNR adjustment unit 250 of the reception device 212 can be configured to normalize (620-*a*) the first received data message 615-*a*, normalize (620-*b*) the second received data message 615-*b*, normalize (620-*c*) the third received data message 615-*c*, and normalize (620-*d*) the fourth received data message 615-*d*, as detailed earlier herein, inter alia with reference to FIG. 5C.

Summarization unit 255 of the reception device 212 can be configured to perform a second equal data summarization 630-*a* of the normalized first received data message and the normalized third received data message, thereby giving rise to an updated first summarized data message. Moreover, summarization unit 255 can be configured to perform a second equal data summarization 630-*b* of the normalized second received data message and the normalized fourth received data message, thereby giving rise to a second summarized data message.

SNR adjustment unit 250 can be configured to normalize (640-*a*) the updated first summarized data message, thereby giving rise to a normalized and updated first summarized data message, and to normalize (640-*b*) the second summarized data message, thereby giving rise to a normalized second summarized data message, as detailed earlier herein, inter alia with reference to FIG. 5C.

Re-assembler 260 of the reception device 212 can be configured to reassemble (650) the normalized and updated first summarized data message and the normalized second summarized data message, thereby giving rise to the encoded data message.

Decoder 265 of the reception device 212 can be configured to decode (660) the encoded data message.

It is to be noted that, with reference to FIGS. 3, 5A to 5C and 6, some of the blocks can be integrated into a consolidated block or can be broken down to a few blocks and/or other blocks may be added. Furthermore, in some cases, the blocks can be performed in a different order than described herein. It is to be further noted that some of the blocks are optional. It should be also noted that whilst the flow diagrams are described also with reference to the system elements that realize them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A transmission device for repeatedly transmitting punctured data messages, the device comprising:
   a puncturing unit configured, for each time slot of two or more consecutive time slots, to puncture an encoded data message with a respective puncture indices series, being a first puncture indices series or a second puncture indices series that is complementary to the first puncture indices series, thereby giving rise to a respective punctured data message having a first code rate that is higher than a second code rate of the encoded data message, the respective punctured data message alternating during the consecutive time slots between a first punctured data message that arises from puncturing the encoded data message with the first puncture indices series and a second punctured data message that arises from the puncturing of the encoded data message with the second puncture indices series; and
   a transmitter configured to alternately transmit the first punctured data message and the second punctured data message during the consecutive time slots.

2. The transmission device of claim 1, wherein the first punctured data message and the second punctured data message are transmitted within a flooding waveform during a flooding window.

3. The transmission device of claim 2, further comprising:
a modulator configured, for each time slot of the consecutive time slots, to modulate a part of the flooding waveform associated with the respective time slot with a distinct training data series that is indicative of the respective time slot.

4. A reception device for reassembling an encoded data message, the device comprising:
a receiver configured to receive punctured data messages during two or more consecutive time slots, the punctured data messages including a first punctured data message and a second punctured data message alternately received during the consecutive time slots; and
a re-assembler configured to reassemble the encoded data message based on the punctured data messages;
wherein the first punctured data message is the encoded data message punctured with a first puncture indices series, wherein the second punctured data message is the encoded data message punctured with a second puncture indices series that is complementary to the first puncture indices series, and wherein each of the punctured data messages has a first code rate that is higher than a second code rate of the encoded data message.

5. The reception device of claim 4, wherein the punctured data messages are received within a flooding waveform during a flooding window.

6. The reception device of claim 4, further comprising:
a signal-to-noise ratio (SNR) adjustment unit configured, based on a respective SNR measurement of each punctured data message of the punctured data messages, to normalize the punctured data messages, thereby giving rise to normalized data messages.

7. The reception device of claim 6, wherein the encoded data message is reassembled based on the normalized data messages.

8. The reception device of claim 6, wherein the first punctured data message is received during a first time slot and a third time slot of the consecutive time slots, and the second punctured data message is received during a second time slot of the consecutive time slots, the second time slot being immediately preceded by the first time slot and immediately followed by the third time slot, and wherein the device further comprises:
at least one summarization unit configured to perform a first equal data summarization of the normalized data messages associated with the first punctured data message received during the first time slot and the third time slot, thereby giving rise to a first summarized data message;
wherein the SNR adjustment unit is further configured to normalize the first summarized data message and a normalized data message of the normalized data messages that is associated with the second punctured data message, thereby giving rise to a normalized first summarized data message and a twice normalized second punctured data message; and
wherein the re-assembler is configured to reassemble the encoded data message based on the normalized first summarized data message and the twice normalized second punctured data message.

9. A transmission method for repeatedly transmitting punctured data messages, the method comprising:
for each time slot of two or more consecutive time slots, puncturing an encoded data message with a respective puncture indices series, being a first puncture indices series or a second puncture indices series that is complementary to the first puncture indices series, thereby giving rise to a respective punctured data message having a first code rate that is higher than a second code rate of the encoded data message, the respective punctured data message alternating during the consecutive time slots between a first punctured data message that arises from the puncturing of the encoded data message with the first puncture indices series and a second punctured data message that arises from the puncturing of the encoded data message with the second puncture indices series; and
alternately transmitting the first punctured data message and the second punctured data message during the consecutive time slots.

10. The transmission method of claim 9, wherein the first code rate is 2/3, and the second code rate is 1/3.

11. The transmission method of claim 9, wherein the first punctured data message and the second punctured data message are transmitted within a flooding waveform during a flooding window.

12. The transmission method of claim 11, further comprising:
for each time slot of the consecutive time slots, modulating a part of the flooding waveform associated with the respective time slot with a distinct training data series that is indicative of the respective time slot.

13. A reception method for reassembling an encoded data message, the method comprising:
receiving punctured data messages during two or more consecutive time slots, the punctured data messages including a first punctured data message and a second punctured data message alternately received during the consecutive time slots; and
reassembling the encoded data message based on the punctured data messages;
wherein the first punctured data message is the encoded data message punctured with a first puncture indices series, wherein the second punctured data message is the encoded data message punctured with a second puncture indices series that is complementary to the first puncture indices series, and wherein each of the punctured data messages has a first code rate that is higher than a second code rate of the encoded data message.

14. The reception method of claim 13, wherein the first code rate is 2/3, and the second code rate is 1/3.

15. The reception method of claim 13, wherein the punctured data messages are received within a flooding waveform during a flooding window.

16. The reception method of claim 13, further comprising:
normalizing the punctured data messages based on a respective SNR measurement of each punctured data message of the punctured data messages, thereby giving rise to normalized data messages.

17. The reception method of claim 16, wherein the encoded data message is reassembled based on the normalized data messages.

18. The reception method of claim 16, wherein the first punctured data message is received during a first time slot and a third time slot of the consecutive time slots, and the second punctured data message is received during a second time slot of the consecutive time slots, the second time slot being immediately preceded by the first time slot and immediately followed by the third time slot, and wherein the method further comprises:
performing a first equal data summarization of the normalized data messages associated with the first punctured data message received during the first time slot and the third time slot, thereby giving rise to a first summarized data message;

normalizing the first summarized data message and a normalized data message of the normalized data messages that is associated with the second punctured data message, thereby giving rise to a normalized first summarized data message and a twice normalized second punctured data message; and wherein the reassembling of the encoded data message is based on the normalized first summarized data message and the twice normalized second punctured data message.

19. The reception method of claim 13, further comprising:
for each respective punctured data message of the punctured data messages received within a flooding waveform during a flooding window, correlating a distinct training data series associated with a part of the flooding waveform over which the respective punctured data message was received and that is indicative of a time slot of the flooding window during which the respective punctured data message was transmitted with all possible training data series' to identify the time slot of the flooding window during which the respective punctured data message was transmitted.

20. A non-transitory computer readable storage medium having computer readable program code embodied therewith, the computer readable program code, executable by at least one processor of a computer to perform a transmission method for repeatedly transmitting punctured data messages, the method comprising:

for each time slot of two or more consecutive time slots, puncturing an encoded data message with a respective puncture indices series, being a first puncture indices series or a second puncture indices series that is complementary to the first puncture indices series, thereby giving rise to a respective punctured data message having a first code rate that is higher than a second code rate of the encoded data message, the respective punctured data message alternating during the consecutive time slots between a first punctured data message that arises from the puncturing of the encoded data message with the first puncture indices series and a second punctured data message that arises from the puncturing of the encoded data message with the second puncture indices series; and alternately transmitting the first punctured data message and the second punctured data message during the consecutive time slots.

21. A non-transitory computer readable storage medium having computer readable program code embodied therewith, the computer readable program code, executable by at least one processor of a computer to perform a reception method for reassembling an encoded data message, the method comprising:

receiving punctured data messages during two or more consecutive time slots, the punctured data messages including a first punctured data message and a second punctured data message alternately received during the consecutive time slots; and reassembling the encoded data message based on the punctured data messages;

wherein the first punctured data message is the encoded data message punctured with a first puncture indices series, wherein the second punctured data message is the encoded data message punctured with a second puncture indices series that is complementary to the first puncture indices series, and wherein each of the punctured data messages has a first code rate that is a higher than a second code rate of the encoded data message.

* * * * *